United States Patent
Kwasinski et al.

(10) Patent No.: US 7,965,797 B2
(45) Date of Patent: Jun. 21, 2011

(54) METHOD, SYSTEM AND APPARATUS FOR GENERATING CONSTANT AMPLITUDE ZERO AUTOCORRELATION SEQUENCES

(75) Inventors: Andres Kwasinski, Greenbelt, MD (US); Ran Katzur, North Potomac, MD (US); Vijay Sundararajan, Richardson, TX (US); Brian Francis Johnson, Kensington, MD (US)

(73) Assignee: Texas Instruments Incorporated, Dallas, TX (US)

( * ) Notice: Subject to any disclaimer, the term of this patent is extended or adjusted under 35 U.S.C. 154(b) by 632 days.

(21) Appl. No.: 12/040,533

(22) Filed: Feb. 29, 2008

(65) Prior Publication Data

US 2009/0116587 A1     May 7, 2009

Related U.S. Application Data

(60) Provisional application No. 60/984,578, filed on Nov. 1, 2007.

(51) Int. Cl.
    *H04L 27/06* (2006.01)
(52) U.S. Cl. ........ 375/340; 375/267; 375/295; 375/299; 375/316; 455/101; 455/132; 455/296; 455/500; 370/334; 370/342
(58) Field of Classification Search .................. 375/267, 375/295, 299, 316, 340; 455/101, 132, 296, 455/500; 370/334, 342
See application file for complete search history.

(56) References Cited

U.S. PATENT DOCUMENTS

| | | | |
|---|---|---|---|
| 2007/0183386 A1 | 8/2007 | Muharemovic et al. | |
| 2008/0240285 A1* | 10/2008 | Han et al. | 375/295 |
| 2008/0310383 A1* | 12/2008 | Kowalski | 370/342 |
| 2009/0067318 A1* | 3/2009 | Kowalski | 370/208 |
| 2009/0110034 A1* | 4/2009 | Kowalski | 375/142 |

FOREIGN PATENT DOCUMENTS

| | | |
|---|---|---|
| WO | WO2007082408 A1 | 7/2007 |
| WO | WO2007087602 A2 | 8/2007 |
| WO | WO2007124451 A2 | 11/2007 |
| WO | WO2007126793 A2 | 11/2007 |
| WO | WO2007127902 A2 | 11/2007 |

* cited by examiner

*Primary Examiner* — Leon Flores
(74) *Attorney, Agent, or Firm* — Steven A. Shaw; W. James Brady; Frederick J. Telecky, Jr.

(57) ABSTRACT

A method, system and apparatus for generating a constant amplitude zero autocorrelation (CAZAC) sequence to be transmitted on a wireless communication channel between a user equipment and a base station within a cellular communication network includes iteratively calculating elements of the CAZAC sequence according to a CAZAC sequence formula until a number of iterations has reached a predetermined iteration value determined in accordance with a number of subcarriers associated with the channel; obtaining a value of particular elements of the CAZAC sequence from a table of stored values at predetermined reset iteration values in order to limit error propagation; and generating the reference signal based upon the elements of the CAZAC sequence. The CAZAC sequence formula is one of a Chu sequence, Frank-Zadoff sequence, Zadoff-Chu (ZC) sequence, and Generalized Chirp-Like (GCL) Sequence.

17 Claims, 10 Drawing Sheets

RESULTS

| m | 0 | 1 | 2 | 3 | 4 |
|---|---|---|---|---|---|
| $x_u(m+1)$ | 0.9572-0.2894j | 0.6365-0.7712j | -0.1896-0.9819j | -0.9790-0.2042j | -0.3036+0.9529j |
| OPERATION | A | A | A | A | A |

| m | 5 | 6 | 7 | 8 | 9 |
|---|---|---|---|---|---|
| $x_u(m+1)$ | 0.9932+0.1175j | -0.3586-0.9337j | -0.4130+0.9107j | 0.7986-0.6018j | -0.9048+0.4261j |
| OPERATION | A | A | A | B | A |

METHOD, SYSTEM AND APPARATUS FOR GENERATING CONSTANT AMPLITUDE ZERO AUTOCORRELATION SEQUENCES

CROSS-REFERENCE TO RELATED APPLICATION

This application claims the benefit of provisional application No. 60/984,578 filed on 1 Nov. 2007, the contents of which are expressly incorporated herein by reference.

TECHNICAL FIELD

The technical field relates generally to an apparatus and method for communication over a wireless communication network and, particularly, to apparatus and methods for communication over a cellular communication network.

BACKGROUND

Referring to FIG. 1, a communication network such as a cellular communication network includes a coverage area or cell 100 defined by an access point, which can be referred to here as a base station 110, but may also be referred to as a base transceiver system (BTS), cell tower, or other appropriate terms. Network users utilize mobile equipment 115 to communicate with the base station 110. The mobile equipment 115 will be referred to here as user equipment (UE), but may also be referred to as mobile stations (MS), mobile terminal (MT), the user, or any other appropriate term. Exemplary mobile UEs include a personal digital assistant (PDA), a wireless telephone (e.g., a cellular phone, a voice over Internet Protocol (VoIP) phone, a smart phone, etc.), a laptop computer with wireless communication capabilities (e.g., including a wireless modem card), etc.

In the cellular communication network, communication resources such as frequencies, time slots, signature codes, channels, reference signals, pilot signals, etc. can be re-used across cells. The transmitters and receivers can be simultaneously present in any given cell. In case of uplink (also known as "reverse link" or any other similar term) communication, transmitters are at UEs 115, and receivers are at the base station 110. In case of downlink (also known as "forward link" or any other similar term) communication, transmitters are at the base station 110, and receivers are at the UE 115.

SUMMARY

Communication can be established between transmitters and receivers of the cellular network via reference signals (RS). The RS may also be referred to as pilot signal, training signal, or any other similar term. Reference signals are used for: channel estimation, channel sounding, channel quality estimation, synchronization, timing-offset estimation, frequency-offset estimation, or for any other purpose. Channel estimates, which are derived from received reference signals, are used for data demodulation.

The reference signal is preferably generated from a sequence having low autocorrelation property for any non-zero time shift of its own replica. However, conventional approaches cannot generate a sequence having a sufficient number of elements frequently enough, particularly for the proposed goals of the so-called fourth generation mobile communications technology (4G).

According to novel embodiments, a sequence for a reference signal, which is a complex valued sequence having constant amplitude (CA) and zero cyclic autocorrelation (CAZAC sequence) with even symmetry, is generated. Examples of CAZAC sequences include: Chu sequences, Frank-Zadoff sequences, Zadoff-Chu (ZC) sequences, and Generalized Chirp-Like (GCL) Sequences.

The sequence can be obtained by iteratively calculating elements of the CAZAC sequence according to a CAZAC sequence formula until a number of iterations has reached a predetermined iteration value determined in accordance with a number of subcarriers associated with the channel. In order to limit error propagation associated with the use of fixed point arithmetic, values of particular elements of the CAZAC sequence can be obtained from a table of stored values at predetermined reset iteration values. Further, in order to lower processor power consumption and computation needs for obtaining the sequence, the iterative calculations can be made until the number of iterations is equal to $$\frac{N_{ZC}^{RS}-1}{2}+1,$$

wherein $N_{ZC}^{RS}$ is the sequence length, which is the largest prime number that is less than the number of subcarriers associated with the channel. The remaining elements of the sequence can be obtaining by taking advantage of the symmetric properties of the sequence. Particularly, remaining elements of the CAZAC sequences can be are assigned to be equal to an symmetric element of the iteratively calculated elements.

A reference signal to be transmitted on a wireless communication channel between user equipment and a base station within a cellular communication network can be generated based upon the sequence. When the CAZAC sequence is generated based upon the ZC sequence formula, a method of generating the CAZAC sequence includes: receiving at one of the user equipment and the base station one or more signals specifying a sequence root u and a sequence length $N_{ZC}^{RS}$, wherein the sequence length is equal to the largest prime number that is less than a number of subcarriers of the channel; generating a constant amplitude zero autocorrelation (CAZAC) sequence based upon formula 1, wherein u is the sequence root and $N_{ZC}^{RS}$ is the sequence length, $$x_u(m) = e^{-j\frac{\pi u m(m+1)}{N_{ZC}^{RS}}}, 0 \le m \le N_{ZC}^{RS}-1. \quad \text{(formula 1)}$$

The sequence generated according to formula 1, can be obtained calculating a first constant k according to $$k = \frac{\pi u}{N_{ZC}^{RS}};$$

calculating a second constant $k_0$ according to $k_0=\cos(2k)$; calculating a third constant $k_1$ according to $k_1=-\sin(2k)$; and iteratively calculating $c_R(m)$, $c_I(m)$, $d_R(m)$, $d_I(m)$, and $x_u(m)$ according to formula 2 until m is equal to a predetermined iteration value or a total number of iterations is equal to $N_{ZC}^{RS}-1$, $$c_R(m+1)=c_R(m)d_R(m)-c_I(m)d_I(m)$$

$$c_I(m+1)=c_I(m)d_R(m)-c_R(m)d_I(m),$$

$$d_R(m+1)=d_R(m)k_0-d_I(m)k_1,$$

$$d_I(m+1) = d_R(m)k_0 + d_I(m)k_1,$$

$$x_u(m+1) = c_R(m+1) + jc_I(m+1) \text{ wherein}$$

$$c_R(0)=1,\ c_I(0)=0,\ d_R(0)=k_0,\ d_I(0)=k_1,\ x_u(0)=1 \qquad \text{(formula 2)}.$$

Regarding the iteratively calculating $c_R(m)$, $c_I(m)$, $d_R(m)$, $d_I(m)$, and $x_u(m)$ according to formula 2, values of $c_R(m)$, $c_I(m)$, $d_R(m)$, and $d_I(m)$ can be obtained based upon a table of values when a reset parameter is equal to a predetermined iteration value in order to obtain a desired precision level.

The symmetric properties of the ZC sequence can be taken advantage of by iteratively calculating $c_R(m)$, $c_I(m)$, $d_R(m)$, $d_I(m)$, and $x_u(m)$ according to formula 2 until the total number of iterations is equal to $$\frac{N_{ZC}^{RS}-1}{2}+1,$$

thereby calculating only half of the sequence. The remaining elements of the sequence can be obtaining by taking advantage of the symmetric properties of the sequence. Particularly, remaining elements of the CAZAC sequences can be are assigned to be equal to a symmetric element of the iteratively calculated elements.

Further, when a processor including a complex multiplication enabled arithmetic logic unit (ALU) for performing single-instruction complex multiplication operations is available, the iterative calculations of $c_R(m)$, $c_I(m)$, $d_R(m)$, and $d_I(m)$ can be performed by single-instructions complex multiplication operations, wherein $$c(m+1) = (c_R(m) + jc_I(m))(d_R(m) + jd_I(m)) \text{ and}$$

$$d(m+1) = (d_R(m)t + jd_I(m))(k_0 + jk_1).$$

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

DETAILED DESCRIPTION

In overview, the present disclosure concerns user equipment (UE) and base stations (BS) of a cellular communication network, a processor for the UE and BS, a memory associated with the processor, and computer readable instructions stored in the memory for configuring the processor. More particularly, various inventive concepts and principles are embodied in systems, apparatuses, and methods for generating complex-valued constant amplitude and zero cyclic autocorrelation (CAZAC) sequences with even symmetry.

The instant disclosure is provided to further explain in an enabling fashion the best modes of performing one or more embodiments of the present invention. The use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in computer instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 1:
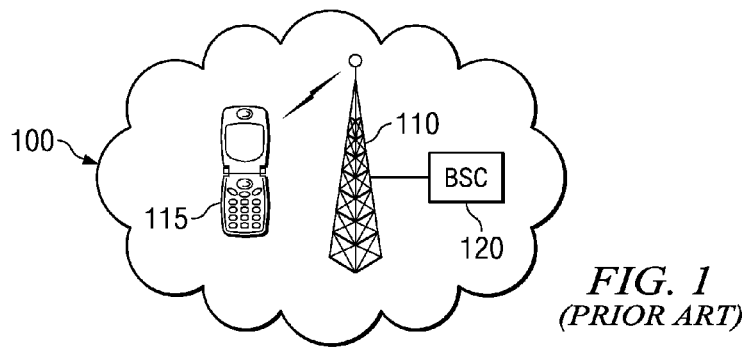
FIG. 1 is a schematic diagram illustrating a simplified and representative wireless network environment in which a method, system or apparatus for generating a constant amplitude and zero cyclic autocorrelation (CAZAC) sequence for a reference signal can be implemented.

Referring to FIG. 1, a representative wireless network environment in which a method, system or apparatus for generating CAZAC sequences is implemented with regards to the UE 115 and the base station controller 120 for the base station 110 or the base station 110 will be discussed.

During wireless operation within the coverage area 100, the base station 110 and the UE 115 share time variant information such as frame numbers, sub-frame offsets, slot offsets, and transmitted symbol offsets, and time independent information such as cell identifications, UE identifications, and noise generator seeds by, for example, broadcasting, direct or indirect signaling, or by any other method of sharing.

The base station 110 and the UE 115 also communicate time variant reference signals for: channel estimation, channel sounding, channel quality estimation, synchronization, timing-offset estimation, frequency-offset estimation, or for any other purpose over a cellular communication channel.

For example, during synchronization, the base station 110 sends a type of reference signal referred to here as a primary synchronization signal that includes a sequence of CAZAC numbers to the UE 115. The UE 115 receives the CAZAC numbers of the primary synchronization signal with different delays. The UE 115 can then generate CAZAC numbers locally based upon the shared time variant and time independent information to compare the delay of the locally generated CAZAC numbers with those received from the base station 110 to estimate channel delay.

In another example, the UE 115 can transmit another type of reference signal referred to here as an uplink demodulation reference signal to the base station 110 in order to determine the channel quality. The uplink demodulation signal also includes a sequence of CAZAC numbers unique to the UE 115 and base station 110 and, in many instances, the time index of the data frame being communicated. The base station 110 generates CAZAC numbers locally to compare with the CAZAC sequence received from the UE 115. The reference signals are not limited to the above examples and can include other types such as random access channel demodulations signals.

In any case, the CAZAC sequences are generated based upon fixed parameters such as; (1) the number of subcarriers or channel frequencies ($M_{SC}^{RS}$); (2) the length of the sequence ($N_{ZC}^{RS}$); and (3) the root of the sequence (u). These fixed parameters are preferably included among shared time variant and time independent information. For example, the length of the sequence can be communicated to the UE 115 as part of the scheduling process that distributes available bandwidth with different UEs. The root may be communicated directly or derived from other parameter previously communicated The CAZAC sequence is preferably generated based upon the Zadoff-Chu (ZC) sequence shown by formula 1:

$$x_u(m) = e^{-j\frac{\pi u m(m+1)}{N_{ZC}^{RS}}}, \quad 0 \le m \le N_{ZC}^{RS} - 1. \quad \text{(formula 1)}$$

The length $N_{ZC}^{RS}$ of the Zadoff-Chu sequence is given by the largest prime number such that $N_{ZC}^{RS} < M_{SC}^{RS}$.

In the Long Term Evolution (LTE) standard of the Fourth Generation Communications System (4G), the possible values for $M_{SC}^{RS}$ are 12, 24 36, 48, 60, 72, 96, 108, 120, 144, 180, 192, 216, 240, 288, 300, 324, 360, 384, 432, 480, 540, 576, 600, 648, 720, 768, 864, 900, 960, 972, 1080, 1152, 1200. Thus, the corresponding possible values for $N_{ZC}^{RS}$ (excluding those less than $M_{SC}^{RS}=36$) are 31, 47, 59, 71, 89, 107, 113, 139, 179, 191, 211, 239, 283, 293, 317, 359, 383, 431, 479, 523, 571, 599, 647, 719, 761, 863, 887, 953, 971, 1069, 1151, 1193. ZC sequences generated based upon these possible values can be used for many applications in the LTE standard such as primary synchronization signal, uplink demodulation reference signal, channel sounding and random access channel (RACH) demodulation.

The ZC sequence can be efficiently generated by using trigonometric properties in an iterative algorithm according to formula 2

$$x_u(m) = e^{-j\frac{\pi u m(m+1)}{N_{ZC}^{RS}}} = \cos\left(\frac{\pi u m(m+1)}{N_{ZC}^{RS}}\right) - j\sin\left(\frac{\pi u m(m+1)}{N_{ZC}^{RS}}\right). \quad \text{(formula 2)}$$

By denoting $$k = \frac{\pi u}{N_{ZC}^{RS}},$$

formula 2 becomes:

$$x_u(m+1) = \cos(k(m^2+m) + 2k(m+1)) - j\sin(k(m^2+m) + 2k(m+1))$$

$$x_u(m+1) = \cos(km(m+1))\cos(2k(m+1)) - \sin(km(m+1))\sin(2k(m+1)) -$$

$$j[\sin(km(m+1))\cos(2k(m+1)) + \cos(km(m+1))\sin(2k(m+1))],$$

because $k(m+1)(m+2) = k(m^2+m) + 2k(m+1)$.

The trigonometric properties below can be used to further simplify formula 2.

$$\cos(2k(m+1))=\cos(2km+2k)=\cos(2km)\cos(2k)-\sin(2km)\sin(2k),$$

$$\sin(2k(m+1))=\sin(2km+2k)=\sin(2km)\cos(2k)+\cos(2km)\sin(2k).$$

If the values of the two constants $\cos(2k)$ and $\sin(2k)$ are known, both $\cos(2k(m+1))$ and $\sin(2k(m+1))$ can be calculated iteratively.

An iterative algorithm for generating CAZAC sequences according to an exemplary embodiment will be discussed with reference to the flow diagram illustrated in FIG. 2A. The flow diagram illustrates exemplary operations of an apparatus implemented within, for example, the UE 115, the base station 110 or the BSC 120.

At 202, a first constant k is calculated according to $$k = \frac{\pi u}{N_{ZC}^{RS}}.$$

Also, a second constant $k_0$ and a third constant $k_1$ are calculated according to $k_0=\cos(2k)$ and $k_1=-\sin(2k)$. The values of the sequence length $N_{ZC}^{RS}$ and root of the sequence u can be obtained from a received message or an associated memory as discussed above. At 204, values for $c_R(m)$, $c_I(m)$, $d_R(m)$, $d_I(m)$, and $x_u(m)$ are assigned for m=0. The assigned values are: $c_R(0)=1$; $c_I(0)=0$; $d_R(0)=k_0$; $d_I(0)=k_1$; and $x_u(0)=1$ in accordance with $$c_R(m)=\cos(k(m^2+m)),$$

$$c_I(m)=-\sin(k(m^2+m)),$$

$$d_R(m) = \cos(2km),$$

$$d_I(m) = -\sin(2km),$$

At 206, one iteration step is performed where, $c_R(m+1)$, $c_I(m+1)$, $d_R(m+1)$, $d_I(m+1)$, and $x_u(m+1)$ are calculated according to formula 3, using the values $c_R(m)$, $c_I(m)$, $d_R(m)$ and $d_I(m)$ calculated in the preceding iteration step or in the initialization step 204:

$$c_R(m+1) = c_R(m)d_R(m) - c_1(m)d_1(m)$$

$$c_I(m+1) = c_1(m)d_R(m) - c_R(m)d_1(m),$$

$$d_R(m+1) = d_R(m)k_0 - d_1(m)k_1,$$

$$d_I(m+1) = d_R(m)k_0 - d_1(m)k_1,$$

$$x_u(m+1) = c_R(m+1) + jc_1(m+1) \quad \text{(formula 3)}.$$

At 208, the value of m is incremented. At 210, it is determined if the value of m is equal to the sequence length $N_{ZC}^{RS}$. Because the initial value of the sequence is determined at m=0, a value of m equal to the sequence length $N_{ZC}^{RS}$ will mean that all of the elements of the sequence have been obtained.

If the value of m is determined to not be equal to the sequence length $N_{ZC}^{RS}$ (NO at 210), then the values of $c_R(m+1)$, $c_I(m+1)$, $d_R(m+1)$, $d_I(m+1)$, and $x_u(m+1)$ are calculated again at 208. The iterative algorithm continues until the value of m is determined to be equal to the sequence length $N_{ZC}^{RS}$ (YES at 210).

Figure 2A:
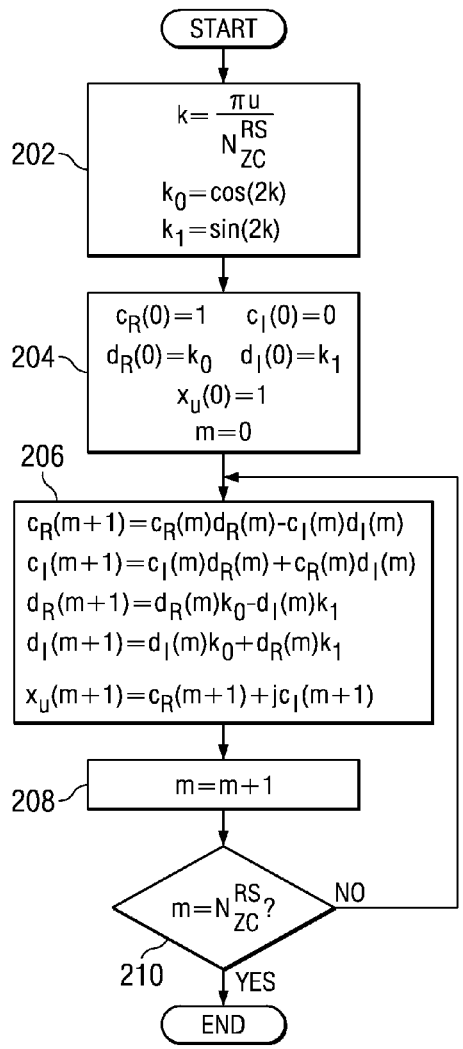
FIG. 2A is a flow diagram illustrating operations of an iterative algorithm for generating a CAZAC sequence according to an exemplary embodiment.

Generally, in the iterative algorithm according to FIG. 2A, $c_R(m)$, $c_I(m)$, $d_R(m)$, $d_I(m)$, and $x_u(m)$ are iteratively calculated according to formula 3 until m is equal to $N_{ZC}^{RS}$. Thus, values of $x_u(m)$ are obtained for m=0 to m=$N_{ZC}^{RS}$−1, because the algorithm stops when m is equal to $N_{ZC}^{RS}$.

The values of the second constant $k_0$ and third constant $k_1$ can preferably be obtained from a table containing sine and cosine values stored in the associated memory. In order to reduce the memory needed for this table while also maintaining precision, the table can be broken up into two (or more, if necessary) tables: one containing coarse representation of the sine and cosine values and the other providing refinement for the coarse values.

For example, when it is necessary to find the cosine of an angle θ, the angle can be represented as the sum of two other angles: θ=φ+γ. The angle φ is defined to take values in the interval $[0, 2\pi(1-2^{-b/2})]$ The angle γ refines the precision of φ and takes values in the interval $[0, 2\pi(1-2^{-b/2})2^{-b/2}]$, so as to provide finer refinement to the values of φ. b is the number of bits used to index the entries into the tables. Thus, each table will have $2^b$ entries. By applying trigonometric formulas, the values of sine and cosine can be calculated as $$\cos(\theta) = \cos(\phi)\cos(\gamma) - \sin(\phi)\sin(\gamma)$$

and $\sin(\theta) = \sin(\phi)\cos(\gamma) + \cos(\phi)\sin(\gamma)$.

Figure 3:
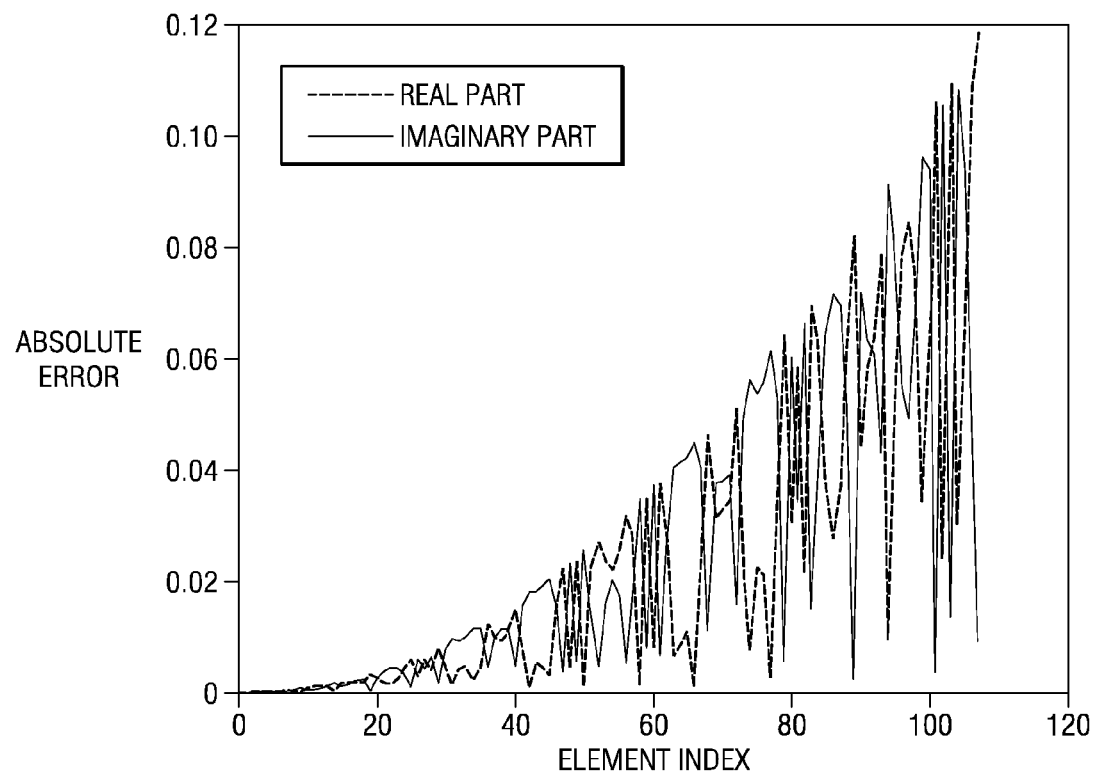
FIG. 3 is a diagram illustrating propagation of errors in a length-107 CAZAC sequence obtained by the iterative algorithm of FIG. 2.

The elements of a CAZAC sequence obtained by the iterative algorithm shown in FIG. 2A will include errors introduced by the finite precision arithmetic. For example, FIG. 3 illustrates the error between the sequence elements of a length-107 ZC sequence calculated using the iterative algorithm of FIG. 2A and the sequence calculated directly from Formula 1. The error for the real part is shown separately from the imaginary part of the sequence elements. The error increases due to error propagation during the iterations. A small portion of the error is due to the use of finite precision (16 bits) in the internal calculations; however, a greater portion of the error is due to the representation of the initial values $k_0$ and $k_1$ using finite precision.

As discussed above, both $k_0$ and $k_1$ can be obtained from the table of values. Although the table stores 16 bit numbers, the precision used to calculate $k_0$ and $k_1$ is determined by the number of entries in the table (the size of the table). This precision implies an error in representing $k_0$ and $k_1$ that is propagated and amplified from iteration to iteration, which is an important part of the errors associated with the use of finite precision arithmetic. However, this error propagation effect can be reduced by taking advantage of the symmetry of the ZC sequence to calculate only half of the sequence elements. Particularly, as discussed below, it can be shown that every ZC sequence is an even function around the middle element in the sequence.

Consider the sequence elements $x_u(m)$ and $x_u(m-n)$. For them to have the same value we require $$e^{-j\frac{\pi u m(m+1)}{N_{ZC}^{RS}}} = e^{-j\frac{\pi u m(m+1)}{N_{ZC}^{RS}} - 2k\pi} = e^{-j\frac{\pi u(m-n)(m-n+1)}{N_{ZC}^{RS}}},$$

for some k∈N and n∈N which implies that $$n(2m - n + 1) = \frac{2kN_{ZC}^{RS}}{u}, \text{ or } k = \frac{nu(2m - n + 1)}{2N_{ZC}^{RS}}.$$

Since $N_{ZC}^{RS}$ is prime, for k∈N we need $2m-n+1=lN_{ZC}^{RS}$ with l∈N⁺. Choosing l=1 leads to $$(2m - n + 1) = N_{ZC}^{RS} \Rightarrow m = \frac{(N_{ZC}^{RS} + n - 1)}{2}.$$

Since $N_{ZC}^{RS}$ is prime (i.e. odd), for m∈N we need n to be even. Then, considering $$n = 0, 2, 4, \ldots, m = \frac{N_{ZC}^{RS} + n}{2} - \frac{1}{2}$$

implies that the sequence is symmetric around the element $$\frac{N_{ZC}^{RS} - 1}{2}$$

(the one in the middle).

Thus, because the ZC sequence is symmetric about its middle element, it is possible to compute only half of the elements of the sequence. Accordingly, the iterative algorithm of FIG. 2A can be modified so that the values $c_R(m)$, $c_R(m+1)$, $c_I(m)$, $c_I(m+1)$, $d_R(m)$, $d_R(m+1)$, $d_I(m)$, $d_I(m+1)$, and $x_u(m+1)$ are calculated until the value of m is determined to be equal to $$\frac{N_{ZC}^{RS} - 1}{2} + 1.$$

The remaining half of the values of the sequence elements $x_u(m)$ can be assigned to be equal to the symmetric elements.

For example, suppose that the sequence has length N. Thus, the value of $x_u(0)$ is assigned to $x_u(N-1)$, the value of $x_u(1)$ is assigned to $x_u(N-2)$, until the middle element $$x_u\left(\frac{N_{ZC}^{RS}-1}{2}\right)$$

is calculated. Because $N_{ZC}^{RS}$ is a prime number, it is always an odd number, so the only element with no "pair" is the middle element.

Figure 2B:
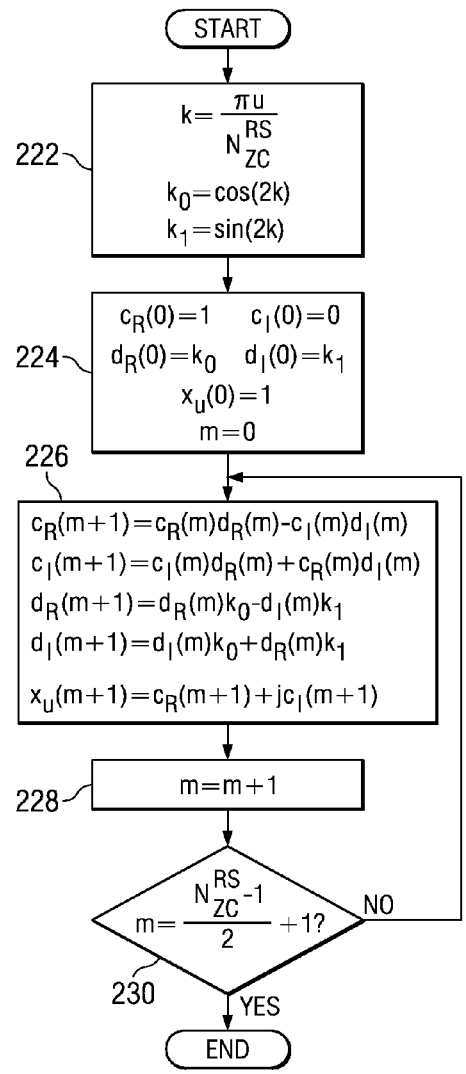
FIG. 2B is a flow diagram illustrating operations of an iterative algorithm for generating a CAZAC sequence according to an exemplary embodiment.

This approach is shown in FIG. 2B. The operations performed at 222-228 are generally similar to the operations performed at 202-208 in FIG. 2A. However, after the value of m is incremented at 228, at 230 it is determined if the value of m is equal to $$\frac{N_{ZC}^{RS}-1}{2}+1,$$

which is one increment past the middle element. If the value of m is determined to not be equal to the sequence length $$\frac{N_{ZC}^{RS}-1}{2}+1$$

(NO at 230), then the values of $c_R(m+1)$, $c_I(m+1)$, $d_R(m+1)$, $d_I(m+1)$, and $x_u(m+1)$ are calculated again at 226, using the values $c_R(m)$, $c_I(m)$, $d_R(m)$ and $d_I(m)$ calculated in the preceding iteration step. The iterative algorithm continues until the value of m is determined to be equal to the sequence length $$\frac{N_{ZC}^{RS}-1}{2}+1 \text{ (YES at 230).}$$

Generally, in the iterative algorithm according to FIG. 2B, $c_R(M)$, $c_I(m)$, $d_R(m)$ $d_I(m)$, and $x_u(m)$ are iteratively calculated according to formula 3 until m is equal to $$\frac{N_{ZC}^{RS}-1}{2}+1.$$

Thus, values of $x_u(m)$ are obtained for $$m=0 \text{ to } m=\frac{N_{ZC}^{RS}-1}{2},$$

because the algorithm stops when m is equal to $$\frac{N_{ZC}^{RS}-1}{2}+1.$$

Each of the remaining half of the values of the ZC sequence can be obtained by assigning each element to be equal to it symmetric elements.

Figure 4:
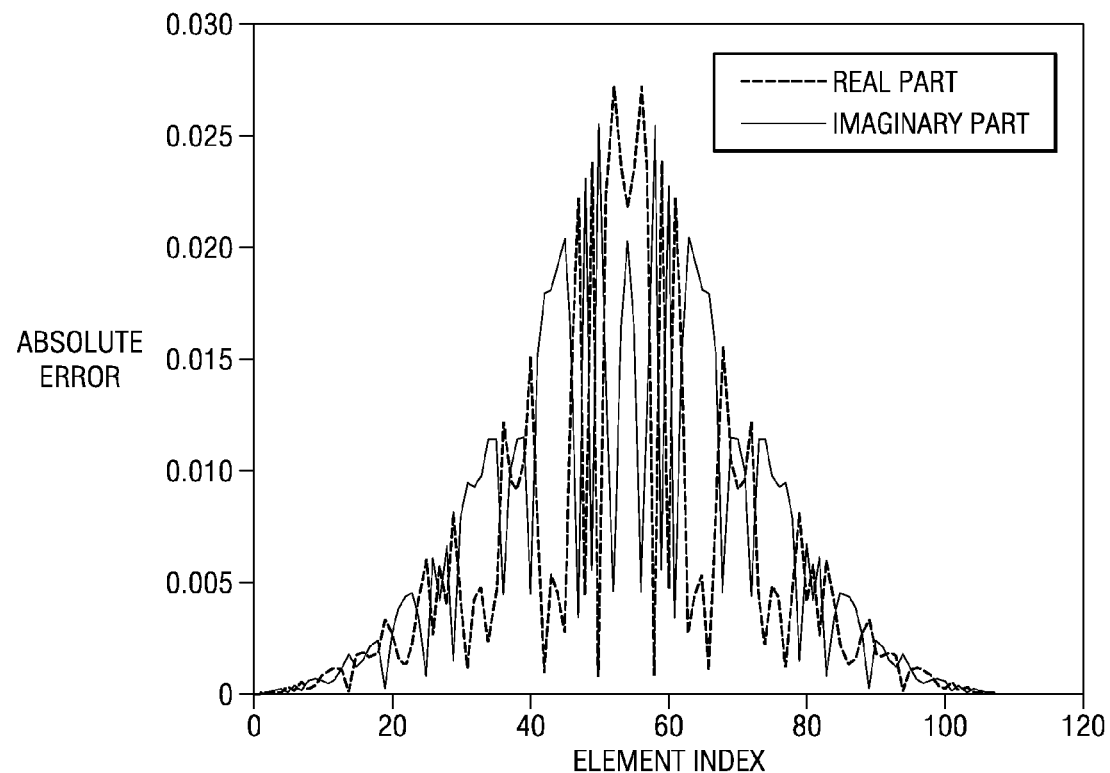
FIG. 4 is a diagram illustrating propagation of errors in the length-107 CAZAC sequence when an even symmetry property is used.

This approach has the advantage of speeding up the algorithm as well as reducing the error propagation effect (because the error is propagated over half the sequence length as originally). FIG. 4 illustrates the reduction in error for sequence elements of a length-107 ZC.

Figure 13:
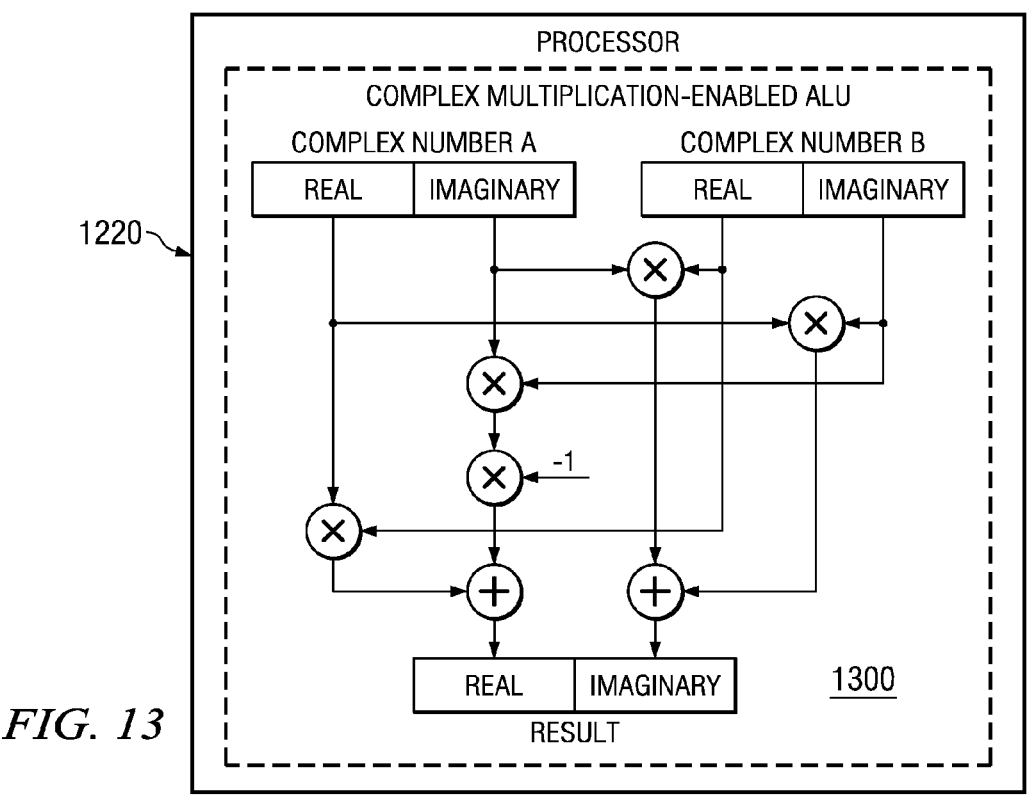
FIG. 13 is an illustration of an exemplary portion of the processor for the apparatus of FIG. 12.

If operations are performed using 16 bits of internal precision, the updates to $c_R$, $c_I$, $d_R$ and $d_I$ can be seen as if they were complex multiplication operations, i.e.: $c(m+1)=c_R(m+1)+jc_I(m+1)=(c_R(m)+jc_I(m))(d_R(m)+jd_I(m))$ $d(m+1)=d_R(m+1)+jd_I(m+1)=(d_R(m)+jd_I(m))(k_0+jk_1)$. These two operations can be implemented very efficiently in any processor or digital computing device with a complex multiply enabled arithmetic logic unit (FIG. 13). For example, with the Texas Instruments' Digital Signal Processor TMS320C64x+ instruction set the update part of the iteration can be implemented using one single complex multiplication operation such as c=_cmpyr1(c,d) and d=_cmpyr1(k,d). The reduction in the number of execution cycles when using this technique far outpaces the errors introduced by performing operations using 16 bits (as opposed to 32 bits). Also, the errors introduced by using 16 bits precision in these operations are small compared to the error introduced from using finite precision arithmetic in the calculation of $k_0$ and $k_1$.

Referring to the flow diagram of FIG. 5A, an iterative algorithm for generating the CAZAC sequence according to an exemplary embodiment will be discussed. The operations at 502 and 508 are similar to the operations performed at 202 and 206 of FIG. 2A. At 504, the value of a reset parameter t is also initialized to one. In order to further reduce the effects of error propagation, at 506 it is determined if the value of t is equal to a predetermined reset iteration value, which is a number less than $N_{ZC}^{RS}-1$. If the value of t is determined to be equal to the predetermined reset iteration value (YES at 506), at 514 the values $c_R$, $c_I$, $d_R$ and $d_I$ are obtained from the same table of values used for $k_0$ and $k_1$ and the value of t is reset to zero. Then, at 510, the values of m and t are incremented. At 512, it is determined if the value of m is equal to the sequence length $N_{ZC}^{RS}$. If the value of m is determined to not be equal to the sequence length $N_{ZC}^{RS}$ (NO at 512), then the procedure returns to 506.

If the value of t is determined to not be equal to the predetermined reset iteration value (NO at 506), the values of $c_R(m+1)$ $c_I(m+1)$, $d_R(m+1)$, $d_I(m+1)$, and $x_u(m+1)$ are calculated again at 508, using the values $c_R(m)$ $c_I(m)$, $d_R(m)$ and $d_I(m)$ calculated in the preceding iteration step at 508, during the initialization step at 504 or in a preceding iteration reset operation at 514. The iterative algorithm continues until the value of m is determined to be equal to the sequence length $N_{ZC}^{RS}$ (YES at 512).

Figure 5A:
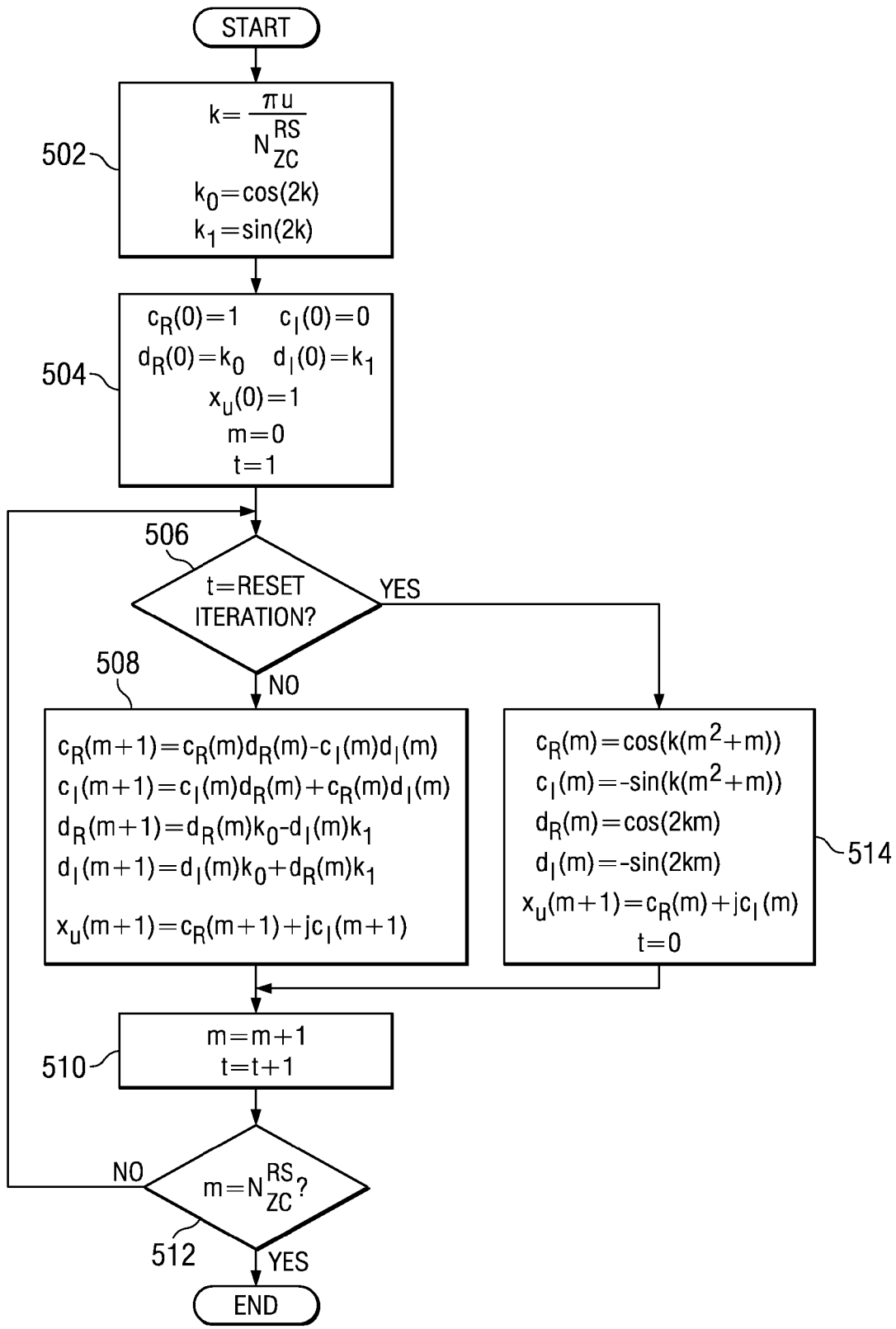
FIG. 5A is a flow diagram illustrating operations of an iterative algorithm for generating a CAZAC sequence according to an exemplary embodiment.

Generally, in the iterative algorithm according to FIG. 5A, $c_R(m)$, $c_I(m)$, $d_R(m)$, $d_I(m)$, and $x_u(m)$ are iteratively calculated according to formula 3 until m is equal to $N_{ZC}^{RS}$ or until a predetermined iteration value t is equal to the predetermined reset iteration value. When t is equal to the predetermined reset iteration value, the values of $c_R(m)$, $c_I(m)$, $d_R(m)$, $d_I(m)$, and $x_u(m)$ are obtained from the table. Thus, values of $x_u(m)$ are obtained for m=0 to m=$N_{ZC}^{RS}-1$, because the algorithm stops when m is equal to $N_{ZC}^{RS}$.

Figure 5B:
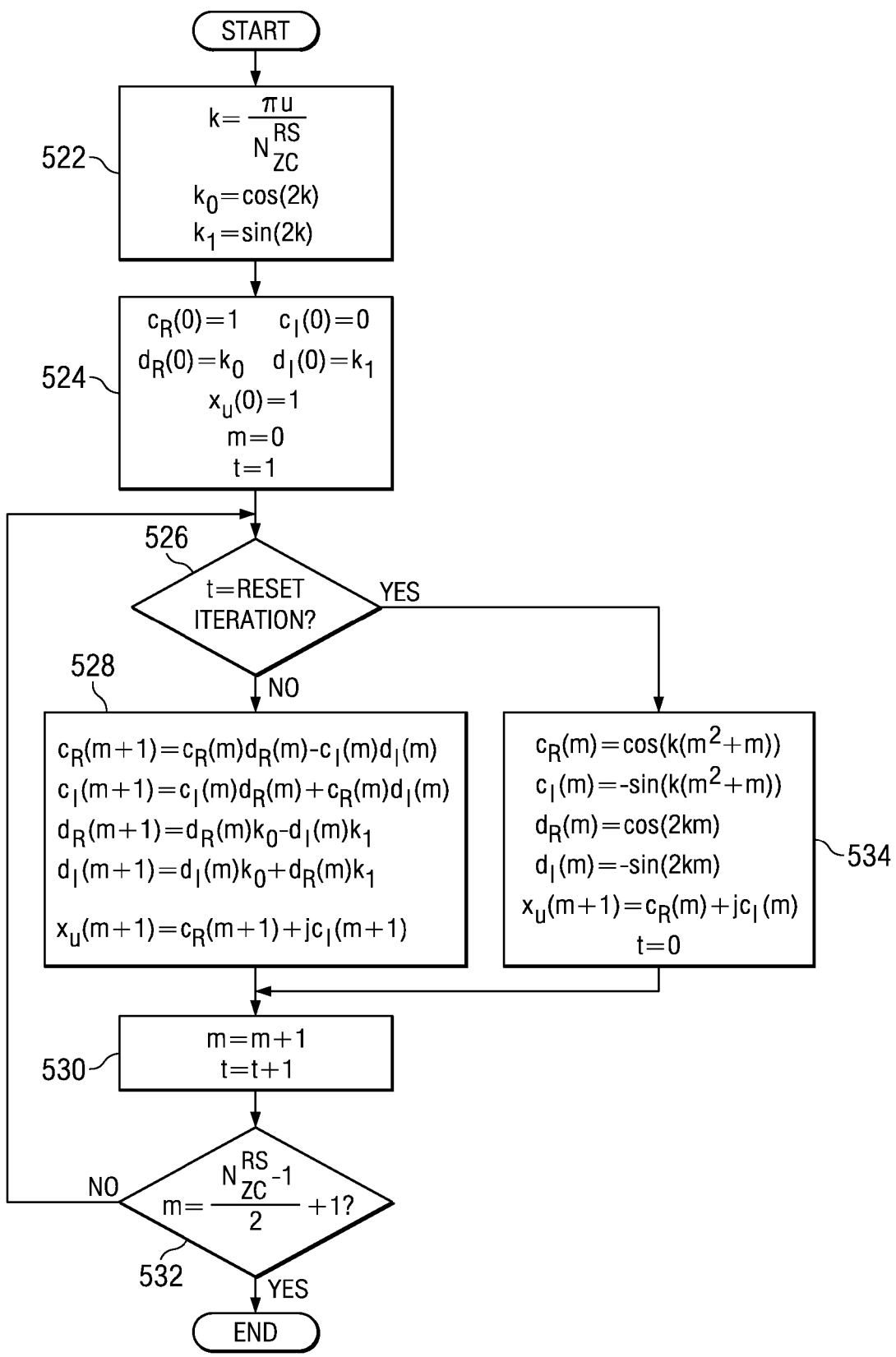
FIG. 5B is a flow diagram illustrating operations of an iterative algorithm for generating a CAZAC sequence according to an exemplary embodiment.

Referring to FIG. 5B, the iterative algorithm can be modified so that after the values of m and t are incremented at 530, at 532 it is determined if the value of m is equal to $$\frac{N_{ZC}^{RS}-1}{2}+1,$$

which is one increment past the middle element. If the value of m is determined to not be equal to the sequence length $$\frac{N_{ZC}^{RS}-1}{2}+1 \text{ (NO at 532)},$$

then the values of $c_R(m+1)$, $c_I(m+1)$, $d_R(m+1)$, $d_I(m+1)$, and $x_u(m+1)$ are calculated again at 528, using the values $c_R(m)$, $c_I(m)$, $d_R(m)$ and $d_I(m)$ calculated in the preceding iteration step at 528, during the initialization step at 524 or in a preceding iteration reset operation at 534 or they are directly calculated the table of values at 534. The iterative algorithm continues until the value of m is determined to be equal to the sequence length $$\frac{N_{ZC}^{RS}-1}{2}+1 \text{ (YES at 532)}.$$

Figure 6:
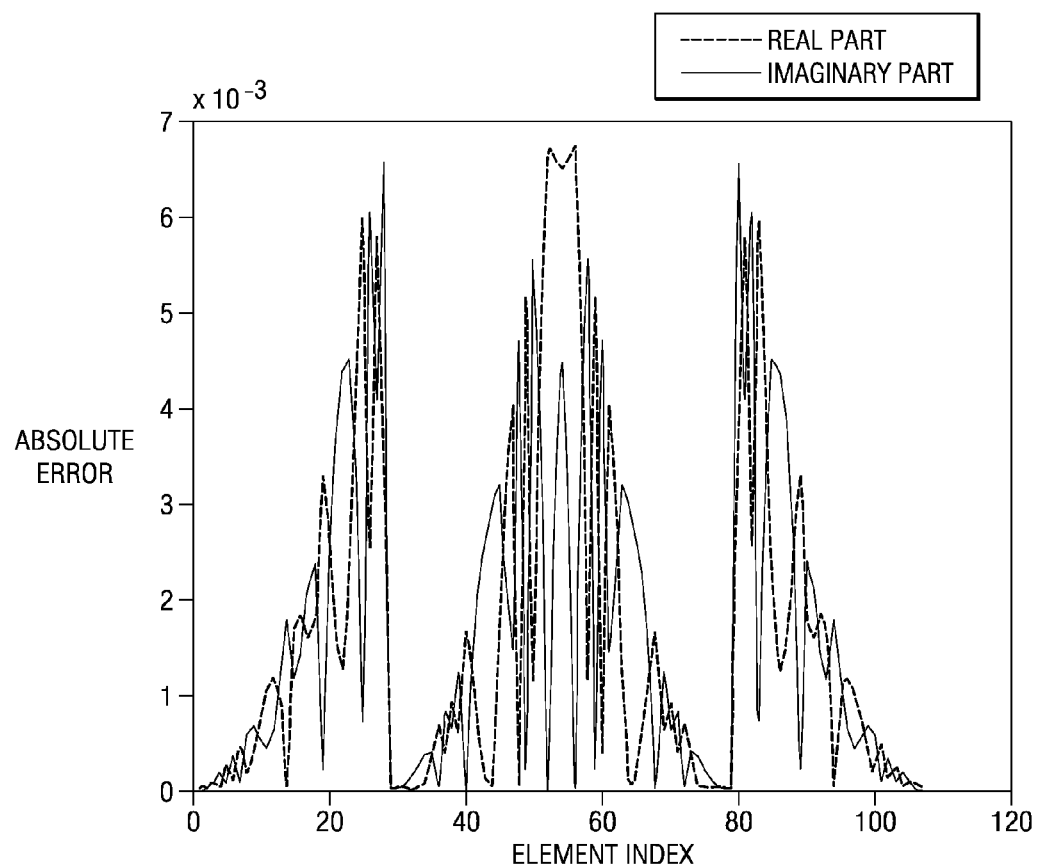
FIG. 6 is a diagram illustrating propagation of errors in the length-107 CAZAC sequence obtained by the iterative algorithm of FIG. 5B when even symmetry property is used and iterations are reset every 28 sequence elements.

In an exemplary operation using the iterative algorithm of FIG. 5B in which the reset iteration value is equal set to 28, the reset parameter is accordingly set to 29 (reset parameter t=29), and the symmetric properties of the sequence are taken advantage of to only calculate half of the sequence elements, the error for the same sequence previously illustrated in FIG. 3 is further reduced as shown in FIG. 6. It should be noted that the value of 28 is taken only as an example and not to limit the invention.

Figure 7A:
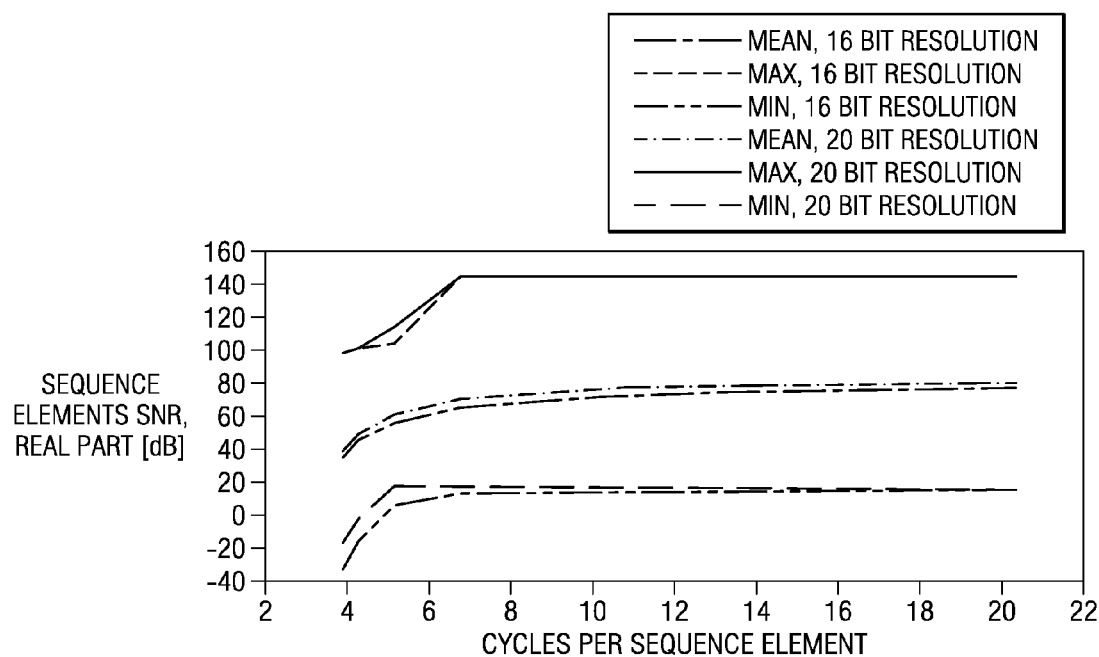
FIGS. 7A-7B are diagrams illustrating sequence element SNR for a CAZAC sequence of length-1193.
Figure 7B:
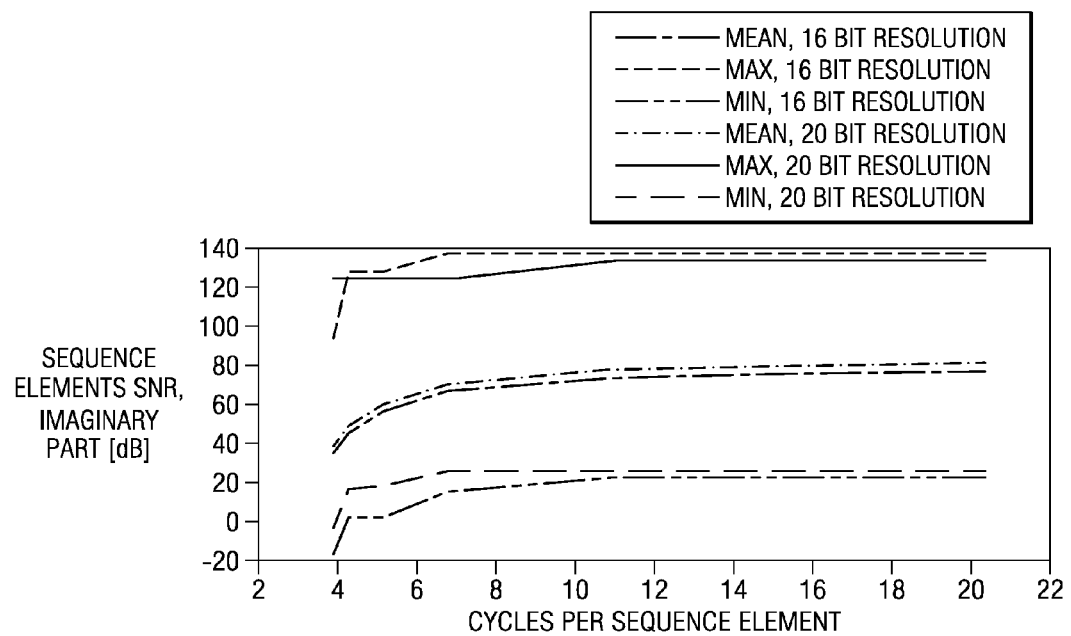
Figure 8A:
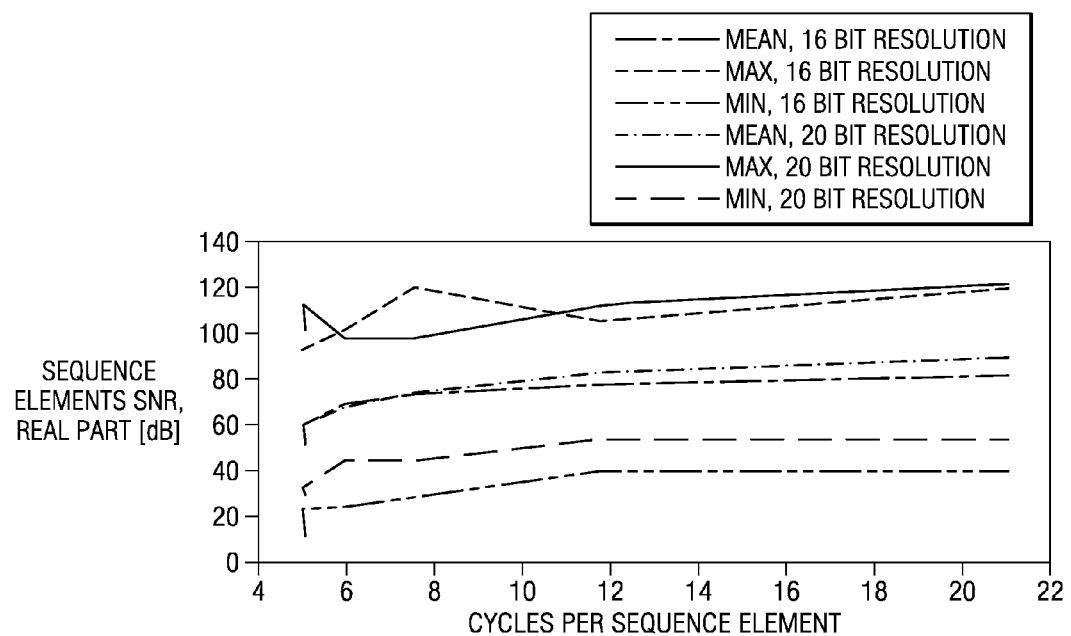
FIGS. 8A-8B are diagrams illustrating sequence element SNR for a CAZAC sequence of length-107.
Figure 8B:
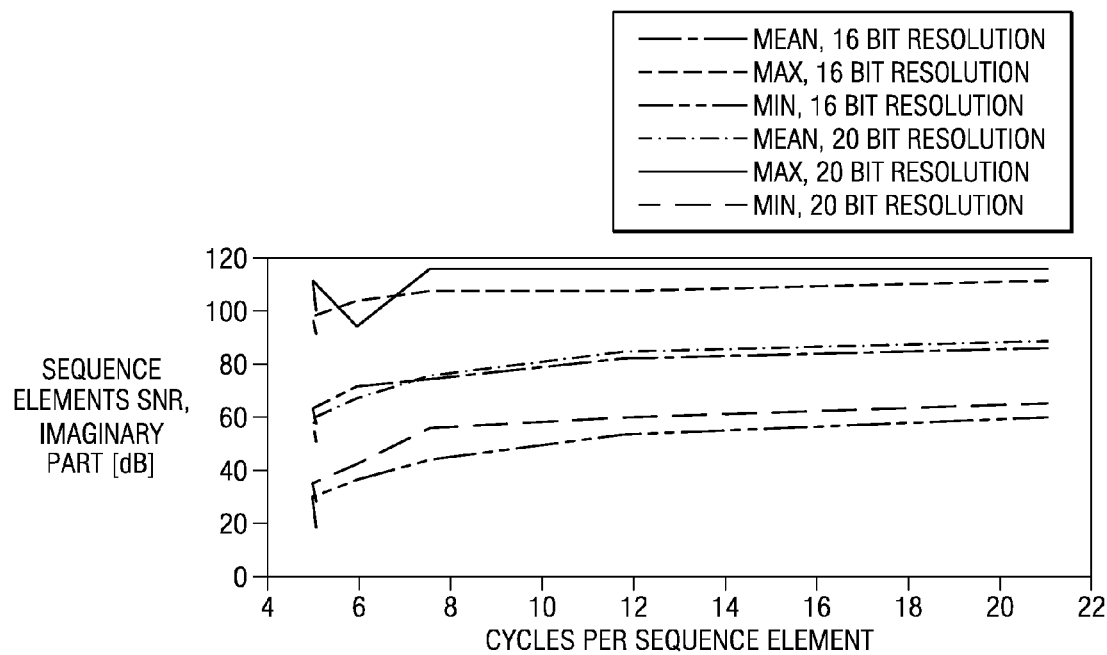

Because the reset operation involves table lookups, the operations of FIGS. 5A-5B require more processing cycles than the operations of FIGS. 2A-2B. Thus, there is a tradeoff between overall execution speed due to the frequency of the reset operation and the desired level of precision due to the error in the sequence elements. Referring to FIGS. 7A-7B and 8A-8B, the error in the sequence computation in terms of the SNR of the sequence elements is shown as a function of the number of cycles per sequence element necessary to compute the sequence (the number of cycles is changed by modifying the frequency with which the iteration is reset). FIGS. 7A-7B illustrate results for a ZC sequence of length 1193 and FIGS. 8A-8B illustrate results for a ZC sequence of length 107.

Figure 9:
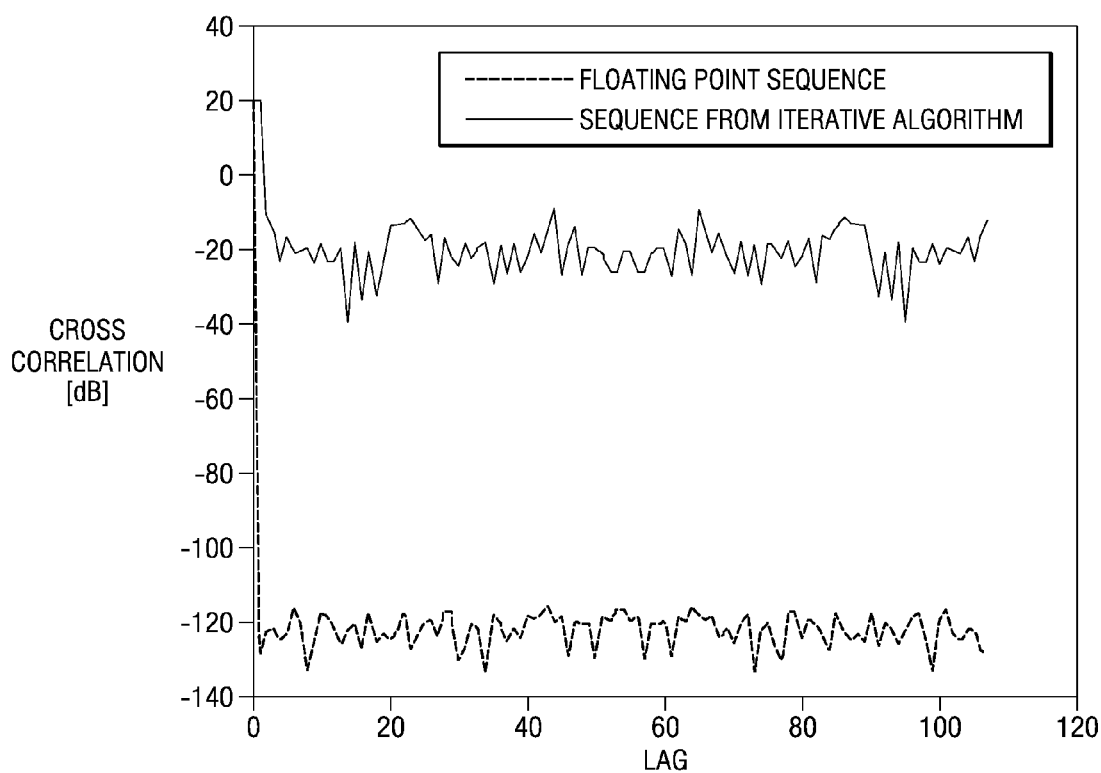
FIG. 9 is a diagram illustrating the autocorrelation of a CAZAC sequence of length-107.

Ultimately, the decision on how frequently to reset the algorithm can be based on the tradeoff between the number of processing cycles required and the result in terms of the properties of interest in the ZC sequence. In other words, the error in computing the sequence element may not be as important as the effect of the error on the properties of interest for the ZC sequence. One such property is the autocorrelation of the sequence. FIG. 9 shows how the autocorrelation of a length 107 sequence is affected by the use of finite precision arithmetic.

Figure 10:
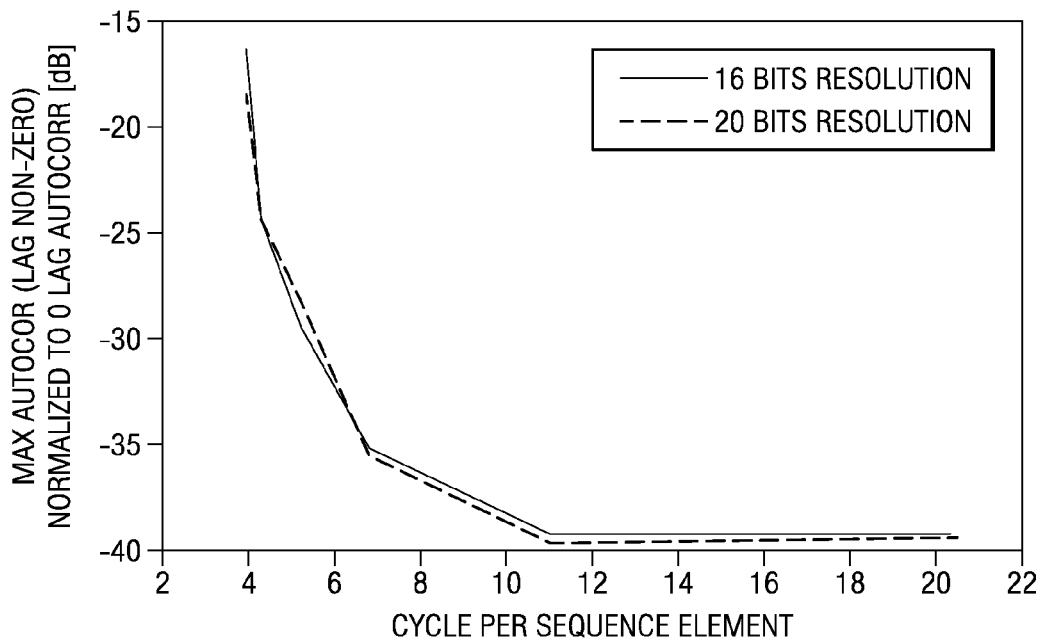
FIG. 10 is a diagram illustrating the maximum autocorrelation for a CAZAC sequence of length-1193.
Figure 11:
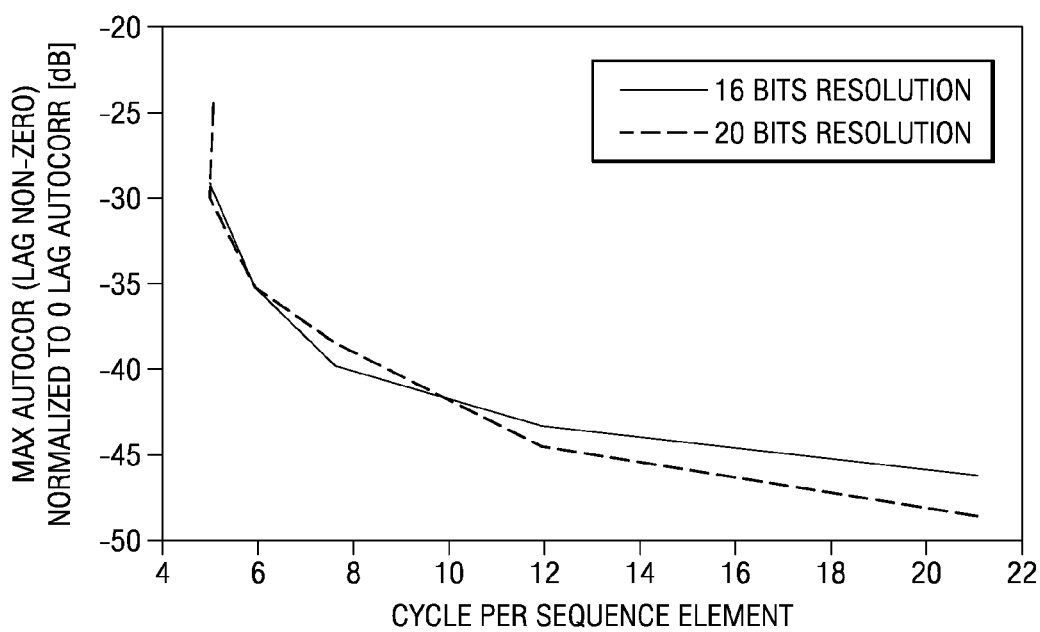
FIG. 11 is a diagram illustrating the maximum autocorrelation for a CAZAC sequence of length-107.

FIGS. 10 and 11 show the maximum autocorrelation for some non-zero lag of the sequences of length 1193 and 107, respectively, as a function of the processing cycles per sequence element (the number of cycles is changed by modifying the frequency with which the iteration is reset). The autocorrelation is normalized to the value of autocorrelation with zero lag so that the difference between the autocorrelation with zero lag and the other one that is closest in magnitude can be seen (the autocorrelation at non-zero lags should be ideally zero in CAZAC sequences). FIGS. 10 and 11 present two curves, one of the curves uses a table with resolution 16 bits to calculate the sine and cosines and the other curve uses a table with resolution 20 bits. The operating point in the tradeoff curve can be decided by taking into consideration the dependency of the generated sequence within a larger system.

Figure 12:
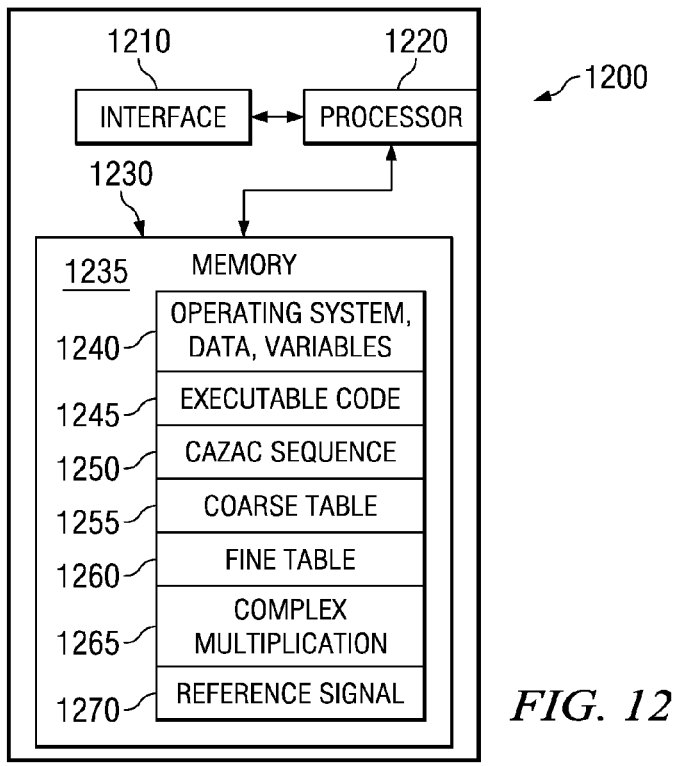
FIG. 12 is a block diagram of portions of an exemplary CAZAC sequence generating apparatus.

Referring to FIG. 12, a block diagram of portions of an exemplary apparatus 1200 for generating a CAZAC sequence for a reference signal to be transmitted on a wireless communication channel between UE 115 and the base station 110 will be discussed. The apparatus 1200 can be implemented within one of the base station 110, UE 115 and/or base station controller 120 of the cell 100. The apparatus 1200 generally includes an interface 1210, a processor 1220 coupled to the interface 1210 and a memory 1230.

The interface 1210 is generally for receiving reception signals from and transmitting transmission signals to, for example, the base station 110 or the UE 115, depending on in which entity the interface 1210 is implemented. The interface 1210 can also receive broadcast messages or demodulation signals specifying parameters such as the sequence root u, the sequence length $N_{ZC}^{RS}$ and/or a CAZAC sequence. Further, the interface 1210 can receive these parameters from the memory 1230 or other hardware components.

The memory 1230 can be one or a combination of a variety of types of memory or computer readable medium such as random access memory (RAM), read only memory (ROM), flash memory, dynamic RAM (DRAM) or the like. The memory 1230 can include a basic operating system, data, and variables 1240, executable code 1245 and other data such as the sequence root U, sequence length $N_{ZC}^{RS}$ and/or a CAZAC sequence and general shared time variant and time independent information.

Further, the memory 1230 can include computer programs or instructions for configuring the processor 1220 such as the CAZAC sequence instructions 1250. The memory 1230 also stores parameters such as the coarse table of cosine and sine values 1255 and the fine table of cosine and sine values 1260.

The CAZAC sequence instructions 1250 can configure the processor 1220 to generate a CAZAC sequence from the Zadoff-Chu sequence, wherein u is the sequence root and $N_{ZC}^{RS}$ is the sequence length.

$$x_u(m) = e^{-j\frac{\pi um(m+1)}{N_{ZC}^{RS}}}, 0 \le m \le N_{ZC}^{RS} - 1$$

(Zadoff-Chu sequence).

The CAZAC sequence instructions 1250 can configure the processor 1220 to generate a CAZAC sequence according to the flow diagram of FIGS. 2A-2B in which $c_R(m)$, $c_I(m)$, $d_R(m)$, $d_I(m)$, and $x_u(m)$ are iteratively calculated until m is equal to $N_{ZC}^{RS}$ or is equal to $$\frac{N_{ZC}^{RS}-1}{2}+1.$$

The CAZAC sequence instructions 1250 can configure the processor 1220 to generate a CAZAC sequence according to the flow diagram of FIGS. 5A-5B in which $c_R(m)$, $c_I(m)$, $d_R(m)$, $d_I(m)$, and $x_u(m)$ are iteratively calculated according to formula 2 until a reset iteration parameter t is equal to a predetermined reset iteration value that is less than $N_{ZC}^{RS}$ or the total number of iterations is equal to $$N_{ZC}^{RS} \text{ or } \frac{N_{ZC}^{RS}-1}{2}+1.$$

When t is equal to the predetermined reset iteration value, the values of $c_R(m)$, $c_I(m)$, $d_R(m)$, and $d_I(m)$ can be obtained from the coarse table 555 and the fine table 560. The processor 1220 continues to iteratively calculate $c_R(m)$, $c_I(m)$, $d_R(m)$, $d_I(m)$, and $x_u(m)$ according to formula 2 until the total number of increments of m is equal to $$N_{ZC}^{RS} - 1 \text{ or } \frac{N_{ZC}^{RS} - 1}{2} + 1.$$

When the CAZAC sequence instructions 1250 configures the processor 1220 to generate a CAZAC sequence according to the flow diagrams of FIG. 2B or FIG. 5B, $c_R(m)$, $c_I(m)$, $d_R(m)$, $d_I(m)$, and $x_u(m)$ can be iteratively calculated according to formula 2 until the total number of iterations is equal to $$\frac{N_{ZC}^{RS} - 1}{2} + 1.$$

The remaining half of the values of the sequence elements $x_u(m)$ for m equal to $$\frac{N_{ZC}^{RS} - 1}{2} + 1 \text{ to } N_{ZC}^{RS} - 1$$

can be assigned to be equal to the symmetric elements.

The memory 1230 can also include complex multiplication instructions 1265 for configuring the processor 1220 to perform complex multiplication when the processor 1220 includes a complex multiplication enabled arithmetic logic unit (ALU) for performing complex multiplication operations. One exemplary ALU is the mnemonic "cmpyr1" Texas Instruments' Digital Signal Processor TMS320C64x+ instruction set. The complex multiplication instructions 1270 can configure the processor 1220 to perform the iterative calculation of $c_R(m+1)$, $c_I(m+1)$, $d_R(m+1)$, and $d_I(m+1)$ by complex multiplication operations, such as c=_cmpyr1(c,d), d=_cmpyr1(k,d) in Texas Instruments' Digital Signal Processor TMS320C64x+ instruction set, wherein $$c(m+1) = (c_R(m) + jc_I(m))(d_R(m) + jd_I(m)) \text{ and}$$

$$d(m+1) = (d_R(m) + jd_I(m))(k_0 + jk_1).$$

Referring to FIG. 13, an exemplary complex multiplication enabled ALU 1300 for performing complex multiplication operations such as Texas Instruments' Digital Signal Processor TMS320C64x+ instruction set c=_cmpyr1(c,d), d=_cmpyr1(k,d) that can be included in the processor 1220 is shown.

Figures 14, 15:
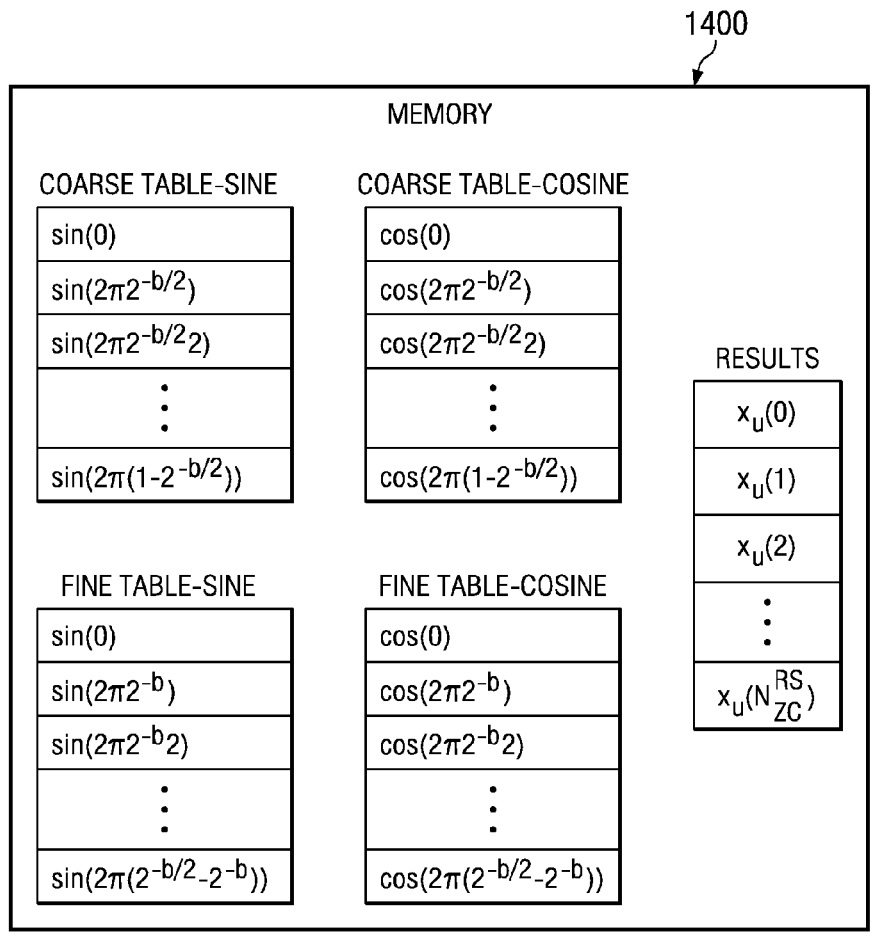
FIG. 14 is an illustration of an exemplary table of values stored in the memory for the apparatus of FIG. 12.
FIG. 15 illustrates exemplary results for a CAZAC reference signal sequence obtained according to the flow diagram of FIG. 5A.

Referring to FIG. 14, exemplary tables of sine and cosine values and values for $x_u(m)$ stored in the memory are shown. The course tables include cosine and sine values for an angle $\phi$ of an interval $[0, 2\pi(1-2^{-b/2})]$. The fine tables include cosine and sine values for an angle $\gamma$ of an interval $[0, 2\pi(1-2^{-b/2})2^{-b/2}]$. One skilled in the art should appreciate that the values could be stored in certain registers or other portions of the memory.

Referring to FIG. 15, exemplary values for $x_u(m+1)$ achieved when the processor executed the iterative algorithm of FIG. 5A are shown for m=[0, 9]. The sequence length $N_{ZC}^{RS}$ was 107 and the sequence root u was 5. The predetermined reset iteration value was set to 8 (reset parameter t=9), thus the values of $c_R(m)$, $c_I(m)$, $d_R(m)$, and $d_I(m)$ were obtained from the tables shown in FIG. 14 when m had been incremented eight times.

The reference signal instructions 1270 can configure the processor 1220 to generate a reference signal to be transmitted by the interface 1230, to derive a CAZAC sequence from a reference signal received by the interface 1230 and compare the received CAZAC sequence with the locally generated CAZAC sequence to determine a channel parameter. In order to generate a reference signal from the CAZAC sequence, the CAZAC sequence can be cyclically shifted by a cyclic shifter based upon the shared time variant and time independent information. A modulator maps samples of the cyclically shifted CAZAC sequence into a designated set of IDFT input tones, which are adapted for further transmission to be sent over the air via a transmitter and antenna. The modulator can be, for example, an OFDM modulator or a DFT-Spread OFDM modulator. Exemplary embodiments for transmitting and receiving reference signals from CAZAC sequences are described in: International Publication No. WO 2007/127902 to Muharemovic et al. entitled "Methods and Apparatus to Allocate Reference Signals in Wireless Communication Systems" and published on Nov. 8, 2007; and International Publication No. WO 2007/126793 to Bertrand et al. entitled "Random Access Structure for Wireless Networks" and published on Nov. 8, 2007, the contents of both of which are incorporated herein by reference.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed.

Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of generating a reference signal based upon a constant amplitude zero autocorrelation (CAZAC) sequence, the reference signal to be transmitted on a wireless communication channel between a user equipment and a base station within a cellular communication network, the method comprising:

iteratively calculating, using a processor, elements of the CAZAC sequence according to a CAZAC sequence formula until a number of iterations has reached a predetermined iteration value determined in accordance with a number of subcarriers associated with the channel and equal to $$\frac{N_{ZC}^{RS} - 1}{2} + 1,$$

wherein $N_{ZC}^{RS}$ is a prime number that is less than the number of subcarriers associated with the channel;

obtaining values of particular elements of the CAZAC sequence from a table of stored values at predetermined reset iteration values in order to limit error propagation assigning a further number of elements of the CAZAC to be equal to symmetric elements of the iteratively calculated elements; and generating the reference signal based upon the elements of the CAZAC sequence.

2. The method of claim 1, wherein the CAZAC sequence formula is one of a Chu sequence, Frank-Zadoff sequence, Zadoff-Chu (ZC) sequence, and Generalized Chirp-Like (GCL) Sequence.

3. The method of claim 1, wherein the predetermined iteration value is equal to a prime number $N_{ZC}^{RS}$ that is less than the number of subcarriers associated with the channel.

4. A method of generating a reference signal to be transmitted on a wireless communication channel between a user equipment and a base station within a cellular communication network, the method comprising:

receiving, at an interface, at one of the user equipment and the base station one or more signals specifying a sequence root u and a sequence length $N_{ZC}^{RS}$, wherein the sequence length is equal to a largest prime number that is less than a number of subcarriers of the channel;

generating a constant amplitude zero autocorrelation (CAZAC) sequence based upon formula 1, wherein u is the sequence root and $N_{ZC}^{RS}$ is the sequence length, $$x_u(m) = e^{-j\frac{\pi um(m+1)}{N_{ZC}^{RS}}}, 0 \le m \le N_{ZC}^{RS} - 1, \quad \text{(formula 1)}$$

comprising: a processor coupled to the interface and configured to:

calculating a first constant k according to $$k = \frac{\pi u}{N_{ZC}^{RS}};$$

calculating a second constant $k_0$ according to $k_0 = \cos(2k)$;
calculating a third constant $k_1$ according to $k_1 = -\sin(2k)$; and iteratively calculating $c_R(m)$, $c_I(m)$, $d_R(m)$, $d_I(m)$, and $x_u(m)$ according to formula 2 until a total number of iterations is equal to $N_{ZC}^{RS} - 1$, $c_R(m+1) = c_R(m)d_R(m) - c_1(m)d_1(m)$ $c_I(m+1) = c_1(m)d_R(m) - c_R(m)d_1(m)$, $d_R(m+1) = d_R(m)k_0 - d_1(m)k_1$, $d_I(m+1) = d_R(m)k_0 + d_1(m)k_1$, $x_u(m+1) = c_R(m+1) + jc_1(m+1)$, wherein $c_R(0)=1, c_I(0)=0, d_R(0)=k_0, d_I(0)=k_1, x_u(0)=1$ (formula 2);

and generating the reference signal based upon the CAZAC sequence.

5. The method of claim 4, wherein the iteratively calculating $c_R(m)$, $c_I(m)$, $d_R(m)$, $d_I(m)$, and $x_u(m)$ according to formula 2 further comprises obtaining values of $c_R(m)$, $c_I(m)$, $d_R(m)$, and $d_I(m)$ based upon a table of values when a reset parameter is equal to a predetermined iteration reset value.

6. The method of claim 5, wherein the predetermined iteration reset value is set in accordance with a desired precision level.

7. The method of claim 4, wherein the iteratively calculating $c_R(m)$, $c_I(m)$, $d_R(m)$, $d_I(m)$, and $x_u(m)$ according to formula 2 is continued until the total number of iterations is equal to $$\frac{N_{ZC}^{RS} - 1}{2} + 1.$$

8. A method of generating a reference signal to be transmitted on a wireless communication channel between a user equipment and a base station within a cellular communication network, the method comprising:

receiving, at an interface, at one of the user equipment and the base station one or more signals specifying a sequence root u and a sequence length $N_{ZC}^{RS}$, wherein the sequence length is equal to a largest prime number that is less than a number of subcarriers of the channel;

generating a constant amplitude zero autocorrelation (CAZAC) sequence based upon formula 1, wherein u is the sequence root and $N_{ZC}^{RS}$ is the sequence length, $$x_u(m) = e^{-j\frac{\pi um(m+1)}{N_{ZC}^{RS}}}, 0 \le m \le N_{ZC}^{RS} - 1, \quad \text{(formula 1)}$$

comprising: a processor coupled to the interface and configured to:

calculating a first constant k according to $$k = \frac{\pi u}{N_{ZC}^{RS}};$$

calculating a second constant $k_0$ according to $k_0 = \cos(2k)$;
calculating a third constant $k_1$ according to $k_1 = -\sin(2k)$;
assigning $x_u(0)=1$;
calculating $c_R(m)$, $c_I(m)$, $d_R(m)$, and $d_I(m)$ according to formula 3, $c_R(m) = \cos(k(m^2+m))$, $c_I(m) = -\sin(k(m^2+m))$, $d_R(m) = \cos(2km)$, $d_I(m) = -\sin(2km)$ (formula 3);

calculating $c_R(m+1)$, $c_I(m+1)$, $d_R(m+1)$, and $d_I(m+1)$ by single-instruction complex multiplication operations, wherein $c(m+1) = (c_R(m) + jc_I(m))(d_R(m) + jd_I(m))$ and $d(m+1) = (d_R(m) + jd_I(m))(k_0 + jk_1)$, calculating $x_u(m+1) = c_R(m+1) + jc_1(m+1)$; and incrementing m and recalculating $x_u(m+1)$ until a reset parameter is equal to a predetermined iteration value less than $N_{ZC}^{RS} - 1$ or a total number of iterations is equal to $N_{ZC}^{RS} - 1$; and generating the reference signal based upon the CAZAC sequence.

9. The method of claim 8, wherein the calculating $c_R(m)$, $c_I(m)$, $d_R(m)$, $d_I(m)$ and $x_u(m+1)$ according to formula 3 further comprises obtaining values of $c_R(m)$, $c_I(m)$, $d_R(m)$, and $d_I(m)$ from a table of stored values when m is equal to a predetermined iteration value.

10. An apparatus for generating a constant amplitude zero autocorrelation (CAZAC) sequence for a reference signal to be transmitted on a wireless communication channel between a user equipment and a base station within a cellular communication network, the apparatus comprising:
an interface for receiving a reception signal specifying a sequence root u and a sequence length $N_{ZC}^{RS}$, and for transmitting a transmission signal to and from at least an other of the base station or the user equipment;
a processor coupled to the interface configured to:
calculate a first constant k according to $$k = \frac{\pi u}{N_{ZC}^{RS}};$$

calculate a second constant $k_0$ according to $k_0 = \cos(2k)$;
calculate a third constant $k_1$ according to $k_1 = -\sin(2k)$; and
iteratively calculate $c_R(m)$, $c_I(m)$, $d_R(m)$, $d_I(m)$, and $x_u(m)$ according to formula 2 until a total number of iterations is equal to $N_{ZC}^{RS}-1$, $c_R(m+1)=c_R(m)d_R(m)-c_I(m)d_I(m)$ $c_I(m+1)=c_I(m)d_R(m)-c_R(m)d_I(m)$, $d_R(m+1)=d_R(m)k_0-d_I(m)k_1$, $d_I(m+1)=d_R(m)k_0+d_I(m)k_1$, $x_u(m+1)=c_R(m+1)+jc_I(m+1)$ wherein $c_R(0)=1, c_I(0)=0, d_R(0)=k_0, d_I(0)=k_1, x_u(0)=1$ (formula 2);

a memory coupled to the processor, the memory including instructions for configuring the processor to:
generate the CAZAC sequence based upon formula 1, wherein u is the sequence root and $N_{ZC}^{RS}$ is the sequence length $$x_u(m) = e^{-j\frac{\pi u m(m+1)}{N_{ZC}^{RS}}}, 0 \le m \le N_{ZC}^{RS} - 1. \quad \text{(formula 1)}$$

11. The apparatus of claim 10, wherein the interface receives another CAZAC sequence from the other of the base station or the user equipment and the processor is further configured to compare the received another CAZAC sequence with the CAZAC sequence locally generated to determine a channel parameter.

12. The apparatus of claim 10, wherein the processor includes a complex multiplication enabled arithmetic logic unit (ALU) for performing single-instruction complex multiplication operations, wherein the processor is further configured to perform the iterative calculation of $c_R(m+1)$, $c_I(m+1)$, $d_R(m+1)$, and $d_I(m+1)$ by single-instructions complex multiplication operations, wherein $c(m+1)=(c_R(m)+jc_I(m))(d_R(m)+jd_I(m))$ and $d(m+1)=(d_R(m)+jd_I(m))(k_0+jk_1)$.

13. The apparatus of claim 10, wherein the memory further includes a table of cosine and sine values.

14. The apparatus of claim 13, wherein the processor is further configured to:
obtain values of $c_R(m)$, $c_I(m)$, $d_R(m)$, and $d_I(m)$ based upon the table of cosine and sine values when a reset parameter is equal to a predetermined reset iteration value that is less than $N_{ZC}^{RS}-1$; and
continue to iteratively calculate $c_R(m)$, $c_I(m)$, $d_R(m)$, $d_I(m)$, and $x_u(m)$ according to formula 2 until the total number of iterations is equal to $N_{ZC}^{RS}-1$.

15. The apparatus of claim 13, wherein the table of cosine and sine values further includes cosine and sine values for an angle φ of an interval $[0, 2\pi(1-2^{-b/2})]$ and for an angle γ of an interval $[0, 2\pi(1-2^{-b/2})2^{-b/2}]$, wherein b refers to a number of bits used for indexing values in the table.

16. The apparatus of claim 10, wherein the processor is further configured to iteratively calculate $c_R(m)$, $c_I(m)$, $d_R(m)$, $d_I(m)$, and $x_u(m)$ according to formula 2 until m is equal to $$\frac{N_{ZC}^{RS}-1}{2} + 1,$$

and to assign values of each remaining element equal to one of the iteratively calculated values symmetric to the each remaining element.

17. An apparatus for generating a constant amplitude zero autocorrelation (CAZAC) sequence for a reference signal to be transmitted on a wireless communication channel between a user equipment and a base station within a cellular communication network, the apparatus comprising:
an interface for receiving a reception signal specifying a sequence root u and a sequence length $N_{ZC}^{RS}$, and for transmitting a transmission signal to and from at least an other of the base station or the user equipment;
a processor coupled to the interface;
a memory coupled to the processor, the memory including instructions for configuring the processor to:
obtain a first constant k according to $$k = \frac{\pi u}{N_{ZC}^{RS}};$$

obtain a second constant $k_0$ according to $k_0 = \cos(2k)$;
obtain a third constant $k_1$ according to $k_1 = -\sin(2k)$; and
iteratively calculate $c_R(m)$, $c_I(m)$, $d_R(m)$, $d_I(m)$, and $x_u(m)$ according to formula 2 until m is equal to $$\frac{N_{ZC}^{RS}-1}{2} + 1$$

or a reset parameter is equal to a predetermined reset iteration value that is less than $$\frac{N_{ZC}^{RS}-1}{2} + 1,$$

$c_R(m+1)=c_R(m)d_R(m)-c_I(m)d_I(m)$ $c_I(m+1)=c_I(m)d_R(m)-c_R(m)d_I(m)$, $d_R(m+1)=d_R(m)k_0-d_I(m)k_1$, $d_I(m+1)=d_R(m)k_0+d_I(m)k_1$, $x_u(m+1) = c_R(m+1) + jc_I(m+1)$ wherein $c_R(0)=1, c_I(0)=0, d_R(0)=k_0, d_I(0)=k_1, x_u(0)=1$  (formula 2);

obtain values of $c_R(m)$, $c_I(m)$, $d_R(m)$, $d_I(m)$ and $x_u(m)$ based upon a table of cosine and sine values when the reset parameter is equal to the predetermined reset iteration value and then continue to calculate $c_R(m)$, $c_I(m)$, $d_R(m)$, $d_I(m)$, and $x_u(m)$ according to formula 2 until m is equal to $$\frac{N_{ZC}^{RS} - 1}{2} + 1$$

or the reset parameter is again equal to the predetermined reset iteration value; and set values of $x_u(m)$ for m equal to $$\frac{N_{ZC}^{RS} - 1}{2} + 1$$

to m equal $N_{ZC}^{RS} - 1$ to be equal to symmetric elements of the iteratively calculated elements.

\* \* \* \* \*